United States Patent [19]

Nakamura et al.

[11] Patent Number: 4,636,897
[45] Date of Patent: Jan. 13, 1987

[54] PERPENDICULAR MAGNETIC RECORDING AND REPRODUCING THIN FILM HEAD

[75] Inventors: Hitoshi Nakamura, Ohme; Kasuo Shiiki, Tsukui; Isamu Yuito, Sendai; Yoshihiro Shiroishi, Hachioji; Hideo Fujiwara, Tokorozawa; Kiminari Shinagawa, Tsukui; Akemi Iijima, Kitatsuru, all of Japan

[73] Assignee: Hitachi, Ltd., Tokyo, Japan

[21] Appl. No.: 539,386

[22] Filed: Oct. 6, 1983

[30] Foreign Application Priority Data

Oct. 15, 1982 [JP] Japan ................ 57-179854

[51] Int. Cl.$^4$ .............. G11B 5/23; G11B 5/235; G11B 5/147; G11B 5/187
[52] U.S. Cl. .................. 360/119; 360/120; 360/125; 360/126; 360/122
[58] Field of Search ........... 360/110, 113, 119, 122, 360/125, 126, 103

[56] References Cited

U.S. PATENT DOCUMENTS

| | | |
|---|---|---|
| 4,036,723 | 7/1977 | Schwartz et al. ............ 360/113 |
| 4,219,854 | 8/1980 | Church et al. ............ 360/125 |
| 4,287,544 | 9/1981 | Lazzari ............ 360/131 |
| 4,295,173 | 10/1981 | Romankiw et al. ............ 360/125 |
| 4,423,451 | 12/1983 | Chi ............ 360/113 |
| 4,458,280 | 7/1984 | Cunningham ............ 360/125 |
| 4,546,398 | 10/1985 | Toda et al. ............ 360/126 |
| 4,550,353 | 10/1985 | Hirai et al. ............ 360/126 |

FOREIGN PATENT DOCUMENTS

| | | | |
|---|---|---|---|
| 56-61018 | 5/1981 | Japan | 360/119 |
| 57-189320 | 11/1982 | Japan | 360/113 |
| 57-208618 | 12/1982 | Japan | 360/119 |
| 58-143414 | 8/1983 | Japan | 360/113 |

OTHER PUBLICATIONS

IBM Technical Disclosure Bulletin, vol. 23, No. 5, Oct. 1980, pp. 2148-2149, "Design ... Recording Heads" by Romankiw et al.

Primary Examiner—A. J. Heinz
Assistant Examiner—Alfonso Garcia
Attorney, Agent, or Firm—Antonelli, Terry & Wands

[57] ABSTRACT

A perpendicular magnetic recording and reproducing thin film head of a structure excellent in magnetic characteristics and easy of fabrication, wherein a lower magnetic layer disposed on a flat nonmagnetic substrate is used as a main magnetic pole, a first insulator layer is formed on the main magnetic pole, a conductor for a coil and a second insulator layer are disposed on the first insulator layer, and an upper magnetic layer which lies in contact with the lower magnetic layer through the first insulator layer at one end thereof and directly at the other end thereof and which overlies the second insulator layer in a part thereof other than both the ends is disposed and used as an auxiliary magnetic pole.

11 Claims, 3 Drawing Figures

PERPENDICULAR MAGNETIC RECORDING AND REPRODUCING THIN FILM HEAD

BACKGROUND OF THE INVENTION

The present invention relates to a perpendicular magnetic recording and reproducing thin film head. More particularly, it relates to a thin film head of a structure which has a high recording density and high recording and reproducing efficiencies, which exhibits excellent magnetic characteristics and which is easy of fabrication.

Various structures have heretofore been proposed as magnetic recording and reproducing thin film heads, and the section of the principal portion of a typical example thereof is shown in FIG. 1. Referring to the figure, numeral 1 designates a nonmagnetic substrate, numeral 2 a lower magnetic layer, numeral 3 an inorganic insulator layer which effects the electrical insulation between the lower magnetic layer 2 and a conductor coil indicated by numeral 4, and numeral 5 an organic insulator layer which effects the electrical insulation between the conductor coil 4 and an upper magnetic layer formed of a magnetic film of high permeability indicated by numeral 6. It is required of a perpendicular magnetic recording head that one magnetic layer be rendered very thin into a main magnetic pole for executing recording and reproduction, while the other be rendered very thick into an auxiliary magnetic pole for forming a closed magnetic path (refer to, for example, Japanese Laid-open Patent Application No. 52-82318). It has heretofore been often the case that the lower magnetic layer is thickened into the auxiliary magnetic pole and that a substrate of a magnetic substance such as Mn-Zn ferrite functins as both the lower magnetic layer and the substrate (refer to, for example, Japanese Laid-open Utility Model Registration Application No. 57-75617). In this manner, in the conventional perpendicular magnetic recording thin film head, (1) the lower magnetic layer serves as the auxiliary magnetic pole for forming the closed magnetic path and is considerably thicker than the upper magnetic layer, and usually it is not patterned, (2) the upper magnetic layer serves as the main magnetic pole for executing recording and reproduction, and it is patterned into a proper shape in order to form recording and reproducing tracks, and (3) in general, in order to decrease the recording current of the conductor coil, the coil is wound spirally (the coil is called a "multi-turn coil"). With the thin film head of such a structure, it is difficult to attain good magnetic characteristics of the main magnetic pole. The reasons are that the upper magnetic layer forms a high step pattern (ordinarily, a step of approximately 10 μm), so the magnetic characteristics are liable to degrade at the step part, and that on account of the multi-turning of the coil intended to enhance the current efficiency, an undulation (small ruggedness) corresponding to the coil pattern is liable to appear in the upper magnetic layer, so the magnetic characteristics degrade. Another disadvantage is that a high dimensional accuracy of the main magnetic pole is not realized in either of cases of patterning the high step by etching and forming the pattern by such a process as sputtering with a mask. Especially when the upper magnetic layer is thick, the patterning is, in effect, impossible. It is therefore difficult to thicken the other part than a part A (shown in FIG. 1) concerned in the recording and reproduction and facing to a magnetic recording medium, thereby to reduce the magnetic reluctance and to raise the efficiencies.

The following references are cited to show the state of the art; (i) Japanese Laid-open Patent Application No. 52-82318, and (ii) Japanese Laid-open Utility Model Registration Application No. 57-75617.

SUMMARY OF THE INVENTION

An object of the present invention is to provide, as a perpendicular magnetic recording and reproducing thin film head, particularly as a multi-turn coil perpendicular magnetic recording and reproducing thin film head, a thin film head of a structure which has a high recording density and high recording and reproducing efficiencies, which exhibits excellent magnetic characteristics and which is easy of fabrication.

The inventors of the present invention have noted that, since the main magnetic pole determining the head performance is the upper magnetic layer in the conventional perpendicular magnetic recording and reproducing thin film head, the degradations of the magnetic characteristics of the upper magnetic layer lead directly to the lowering of the head performance. In the present invention, in order to prevent the degradations of the magnetic characteristics stated above and to accomplish the aforementioned object, the main magnetic pole is formed of the lower magnetic layer which is made on a flat nonmagnetic substrate and which is easy of patterning less apt to degrade magnetic characteristics. This realizes a thin film head which has a high recording density and high recording and reproducing efficiencies and whose magnetic characteristics are excellent.

The thickness of the lower magnetic layer and the upper magnetic layer may be similar to those of the main magnetic pole and the auxiliary magnetic pole in the prior art, respectively. Usually, that part of the main magnetic pole which faces to a magnetic recording medium and which is 2–5 μm long is 0.1–1 μm thick, with the other part of the main magnetic pole being 1–6 μm thick, and the auxiliary magnetic pole is 5–40 μm thick. The thicknesses, however, need not be restricted to these values. In addition, the main magnetic pole may well be put into a uniform thickness of, for example, 0.1 μm–1 μm.

Regarding the constructions of the respective portions other than the lower magnetic layer and the upper magnetic layer, the prior art may be conformed to.

In the perpendicular magnetic recording and reproducing thin film head of the present invention, the lower magnetic layer formed on the nonmagnetic substrate serves as the main magnetic pole. Therefore, in order to prevent any gap degrading the characteristics from arising between the magnetic recording medium and the main magnetic pole during operation, and angle θ which the surface of the substrate facing to the recording medium defines to the upper surface of the substrate formed with the lower magnetic layer thereon should more preferably be made 60°–87°, still more preferably 80°–85°, not 90°. However, even when the angle is made 90° as in the prior art, the effects of the present invention are noted.

The upper magnetic layer in the thin film head of the present invention can be formed by such a process as sputtering with a mask, evaporation with a mask or plating, and it need not undergo the step of etching. Of course, the pattern of the upper magnetic layer may well be formed via the step of photoetching as in the prior art. Since, however, the upper magnetic layer is the auxiliary magnetic pole, it is thick, and the formation by the etching is often attended with difficulty.

As a material for the upper magnetic layer and the lower magnetic layer, the prior art may be conformed to, and there is used any of materials of high permeability which can be formed into thin films, for example, permalloys (Ni-Fe alloys) and amorphous magnetic alloys of high permeability (Co-Cr-Zr alloys etc.). In particular, a material of high saturation flux density is favorable for the upper magnetic layer serving as the main magnetic pole.

DESCRIPTION OF THE PRESENTLY PREFERRED EMBODIMENT

Figure 2:
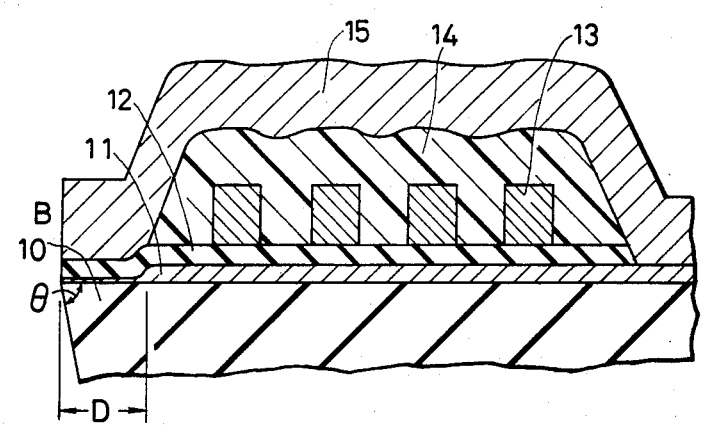
FIG. 2 is a sectional view of a perpendicular magnetic recording and reproducing thin film head in an embodiment of the present invention.

FIG. 2 shows the vertical section of the principal portions of a perpendicular magnetic recording and reproducing thin film head in an embodiment. Referring to the figure, numeral 10 designates a nonmagnetic substrate. In an example, "Photoceram" (trade name of Corning Glass Works) which was 40 mm in diameter and 1 mm in thickness was used. It is also possible to use a nonmagnetic substrate made of "7059 Glass" (trade name of Corning Glass Works) or ceramics such as $Al_2O_3$ or $Al_2O_3$-TiC. Numeral 11 indicates a lower magnetic layer which is formed by the sputtering process with a target having a composition of 77.5 wt % Ni-22.5 wt % Fe. In the example, the thickness of the lower magnetic layer in the vicinity of a part B facing to a magnetic recording medium was 0.5 $\mu$m, and the thickness thereof on a rear core side was 3 $\mu$m. It is ordinarily desirable to set the thickness of the lower magnetic layer in the vicinity of the face at approximately 0.1-1 $\mu$m and the thickness of the rear core at approximately 1-6 $\mu$m. Although efficiencies worsen to some extent, it is also possible to simplify the manufacturing process by equalizing the rear core in thickness to the vicinity of the face without thickening it. The length D of the thin part of the lower magnetic layer in the vicinity of the face is recommended to be approximately 2-5 $\mu$m, and it was made 2 $\mu$m here. Numeral 12 indicates an insulator layer which serves for the electrical insulation between the lower magnetic layer 11 and a conductor coil at numeral 13. In the example, $SiO_2$ was deposited to a thickness of 3 $\mu$m by the sputtering process. As the conductor coil 13, Al (aluminum) is deposited by the evaporation process. Here, it was a spiral type multiple-wound coil of four turns whose conductor section was 4 $\mu$m wide and 6 $\mu$m high. Numeral 14 denotes an organic insulator layer of a polyimide resin or the like which is used for the electrical insulation between the conductor coil 13 and an upper magnetic layer at numeral 15 and also for the flattening of the upper surface of the 4-turn multiple coil. Here, "PIQ" (trade name of Hitachi Kasei Kabushiki-Kaisha) which is polyimide isoindro quinazolinedione resin was used. The thickness of the PIQ as measured from the upper surface of the insulator layer 12 was 6 $\mu$m. The step of flattening the upper surface of the coil by utilizing the viscosity of the PIQ is already known. In the prior-art magnetic head, the insulator layer needs to be flattened to the utmost in order that the magnetic characteristics of the upper magnetic layer being the main magnetic pole may be prevented from degrading. In contrast, in the magnetic head of the present invention, the insulator layer 14 need not be very flat because a thick auxiliary magnetic pole is formed thereon, and it may sometimes be made of an inorganic insulator such as $SiO_2$ without using an organic substance. In the above head producing process, patterning was carried ou by the use of the photolithographic technique. Such techniques and the structure of the head other than the principal portions are the same as hitherto known ones, and shall be omitted herefrom. As the upper magnetic layer 15, an amorphous alloy composed of 76 at % Co - 12 at % Cr - 12 at % Zr was formed to a thickness of about 20 $\mu$m by the sputtering process. In order to form the magnetic layer in a desired shape, a mask was placed during the sputtering so as to deposit the magnetic substance on only a desired part. This is a technique which is usually known as the mask sputtering process. In general, with the mask sputtering, a magnetic substance turns around through the clearance between a mask and a specimen and deposits on the specimen, and the registration of a pattern with another pattern formed is difficult, so that precision is inferior. In contrast, in the present invention, the upper magnetic layer serves as the auxiliary magnetic pole for merely forming a closed magnetic path, and hence, the purpose can be satisfactorily achieved. Since etching etc. for forming a pattern are not performed, a sufficiently thick film can be used as the upper magnetic layer. It is ordinarily desirable for the characteristics of the magnetic head to set the thickness of the upper magnetic layer at 5-40 $\mu$m.

For the same purpose, it is also possible to employ fabricating expedients such as evaporation with a mask and plating.

The construction and function of the thin film head according to the present invention differ from those of the prior-art thin film head in the following points:

(1) The lower magnetic layer which is made of the magnetic film of high permeability plays the role of the main magnetic pole. (2) The lower magnetic layer which is formed on the flat substrate is excellent in magnetic characteristics as the magnetic film and the reproducibility thereof, and it has an excellent dimensional accuracy owing to the easy formation of the pattern, so that it is very superior as the main magnetic pole which determines the magnetic characteristics of the head.

Figure 3:
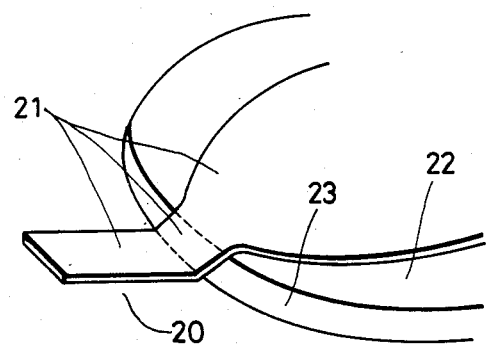
FIG. 3 is a bird's eye view of a perpendicular magnetic recording and reproducing thin film head in a prior art.

FIG. 3 shows a bird's eye view of a thin film head in a prior art. Numeral 20 denotes a lower magnetic layer, numeral 21 an upper magnetic layer which serves as a main magnetic pole, numeral 22 an organic insulator layer which covers a coil pattern, and numeral 23 a step part which is attributed to the organic insulator layer. In FIG. 3, the illustration of the concrete shape of the lower magnetic layer 20 is omitted. The process of the thin film head in the prior art involves the disadvantage that, since the upper magnetic layer is used as the main magnetic pole for recording and reproduction, patterning which includes the high step as shown in FIG. 3 is needed, so the dimensional accuracy is inferior. According to the manufacturing process of the thin film head based on the present embodiment, the main magnetic pole is the lower magnetic layer and is patterned on the flat substrate, so that the dimensional accuracy is enhanced to improve the available percentage in mass production.

The head of the present embodiment is finished up into the final configuration by machining steps such as cutting, lathing and lapping after the proper patterns of the respective layers have been formed on the substrate. Since these steps are hitherto-known processes, they are omitted herefrom. The section of the principal portions shown in FIG. 2 corresponds to the final head which has undergone the machining steps. The surface of the substrate facing to the recording medium is not right-angled to the surface of the substrate formed with the patterns thereon. This is intended to improve the touch between the recording medium and the main magnetic pole and to bring them as close as possible. In the present invention in which the main magnetic pole lies directly on the substrate, the surface of the substrate facing to the recording medium should more desirably be in a shape retreating from the plane of the recording medium. In the present example, the angle $\theta$ was 84°. Such angling can be readily achieved by lapping the surface obliquely.

The recording and reproducing characteristics of the head of the example of the present embodiment were measured by the use of a perpendicular magnetic recording medium in which a perpendicular magnetic film of a Co-Cr alloy layer was formed on an Ni-Fe alloy layer. The optimized recording current was approximately 30 mA at a recording density of 10 KBPI (Kilo Bit per Inch), and this was about ⅓ of the value of the prior-art head shown in FIG. 1. The reproduction output at 1 KBPI was approximately 0.24 mV$_{p-p}$, which was about 1.5 times that of the prior-art head.

Figure 1:
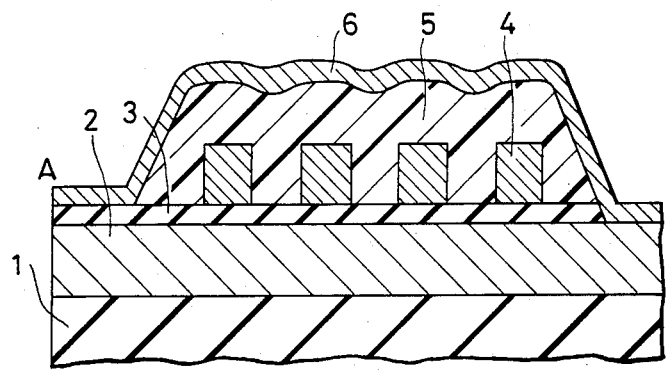
FIG. 1 is a sectional view of a perpendicular magnetic recording and reproducing thin film head in a prior art.

The prior-art head of FIG. 1 used for the comparisons was substantially the same in construction as the head of the present embodiment, except that the lower magnetic layer 2 which was made of Mn-Zn ferrite and which was 1,000 μm thick was used as the auxiliary magnetic pole and that the upper magnetic layer 6 (0.5 μm thick) whose side facing to the recording medium was not thinned was used as the main magnetic pole.

In the example of the present embodiment, the Ni-Fe alloy was used as the material of the main magnetic pole. The saturation flux density of this material is about 10 kG. A material having the highest possible saturation flux density should desirably be selected in order that magnetic saturation may be prevented from developing in the main magnetic pole for executing the recording, particularly in the part near the face to the recording medium. When an Fe - 6.5 wt % Si - 1 wt % Ru alloy having a saturation flux density of about 18 kG was formed by the sputtering process and used as the material of the main magnetic pole, enhancement in the reproduction output amounting to about 1.5 times was noted in comparison with the case of the Ni-Fe alloy. In general, alloys containing Fe and Si as principal ingredients, which are doped with an element such as Ru, Ti or Cr at 0.5-2 wt %, exhibit high saturation flux densities. It is therefore desirable to employ any of the alloys as the material of the main magnetic pole in case of performing the present invention. The material of the main magnetic pole, however, need not be restricted to the alloys. When the temperature of the substrate during the sputtering is low, any of the alloys comes to have unfavorable magnetic characteristics such as a low permeability and a great coercive force. It is accordingly necessary to set the substrate temperature at approximately 350° C.–400° C. In the prior-art head, the material of the main magnetic pole must be formed on the organic insulator, such as the polyimide resin, used for the flattening. At the high temperature of about 350° C., however, the PIQ resin reacts to be decomposed upon contact with the Fe-Si alloy, and the formation of the material of the main magnetic pole is difficult. In the prior art, therefore, when the Fe-Si alloy is used as the material of the main magnetic pole, the magnetic characteristics are sacrificed, or alternatively, an intermediate film of Al$_2$O$_3$ or the like needs to be interposed by adding to a step lest the polyimide resin or the like organic insulator and the Fe-Si alloy should come into direct contact. Since, in the present invention, the main magnetic pole is formed on the substrate of glass or the like, it poses no problem to set the substrate temperature at about 350° C.

Besides the Fe-Si alloy, the material of high saturation flux density includes alloys which principally contain Fe and Ti. For example, an Fe - 8 wt % Ti alloy has a saturation flux density of 15 kG, and is more desirable than the Ni-Fe alloy as the material of the main magnetic pole. Moreover, such alloys sometimes have their magnetic characteristics enhanced more by putting them into stacked structures with SiO$_2$ etc. in hitherto-known fashion. This can also be applied to the present invention.

In the example of the present embodiment, the Co-Cr-Zr amorphous alloy was used as the material of the auxiliary magnetic pole. The reason is that, since the alloy can form a film of good magnetic characteristics even at a low substrate temperature during the sputtering, it is readily formed on the organic insulator such as the polyimide resin or the polyimide isoindro quinazolinedione resin. In addition, when the crystalline alloy such as the Ni-Fe alloy or the Fe-Si alloy becomes a thick film thicker than about 10 μm, it is apt to peel away from the substrate. Also in this respect, the amorphous alloy as mentioned above is more convenient. In the present invention, the film to serve as the auxiliary magnetic pole is desired to have a sufficient thickness and a satisfactory adhesion, and the amorphous alloy material is the most suitable therefor. The amorphous alloys suited to the present invention include Co-Cr-Zr-based alloys such as Co$_{74}$Cr$_{13}$Zr$_{13}$ and Co$_{78}$Cr$_{11}$Zr$_{11}$, Co-Mo-Zr-based alloys such as Co$_{77}$Mo$_{13}$Zr$_{10}$, and further, Co-V-Zr-based alloys, Co-Nb-Zr-based alloys, Co-W-Zr-based alloys, Co-Ti-based alloys, etc. In case of using the head in a high frequency band, when any of the amorphous alloys is put into a stacked structure with an insulator such as SiO$_2$ or Al$_2$O$_3$, more favorable results are obtained. Numerals in the composition formulas indicate atomic %.

According to the present invention, a lower magnetic layer is used as a main magnetic pole and an upper magnetic layer as an auxiliary magnetic pole, whereby a perpendicular magnetic recording and reproducing thin film head having good magnetic characteristics is provided. When compared with a prior-art thin film head employing an upper magnetic layer as a main magnetic pole, the thin film head according to the present invention is enhanced more than about 30% in terms of the recording current efficiency. A process in the invention is easier than one now in use, and patterning at a high step problematic in the process now in use is not necessary. Consequently, the precision of pattern dimensions improves. The precision of ±10% in the process now in use becaomes ±3% in the present invention.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic recording and reproducing thin film head, comprising:
   a nonmagnetic substrate as a bottom member, having an upper surface;
   a lower magnetic layer which is formed on said nonmagnetic substrate on the upper surface of the nonmagnetic substrate;
   a first insulator layer formed on said lower magnetic layer;
   a coil conductor layer formed on said first insulator layer;
   a second insulator layer which overlies said first insulator layer and said coil conductor layer so as to bury said coil conductor layer therein;
   and an upper magnetic layer which is formed on said second insulator layer; which is formed on said first insulator layer at the end facing the recording medium so as to form a magnetic gap between the upper and lower magnetic layers; and which is formed on said lower magnetic layer at the other end, said lower magnetic layer having a thickness smaller than that of the upper magnetic layer, said lower magnetic layer and said upper magnetic layer functioning respectively as a main magnetic pole and an auxiliary magnetic pole of the thin film head; and wherein an angle defined between a surface of said substrate facing to a magnetic recording medium and said upper surface of said substrate is less than 90°, whereby a gap between the magnetic recording medium and the main magnetic pole during operation is reduced.

2. A perpendicular magnetic recording and reproducing thin film head as defined in claim 1, wherein said angle is 60°–87°.

3. A perpendicular magnetic recording and reproducing thin film head as defined in claim 1, wherein the nonmagnetic substrate is made of a glass or ceramic material.

4. A perpendicular magnetic recording and reproducing thin film head as defined in claim 1, wherein said second insulator layer is not flat.

5. A perpendicular magnetic recording and reproducing thin film head as defined in claim 1, wherein said lower magnetic layer is 0.1 $\mu$m to 1 $\mu$m thick, and said upper magnetic layer is 5 $\mu$m to 40 $\mu$m thick.

6. A perpendicular magnetic recording and reproducing thin film head as defined in claim 1, wherein a part of said lower magnetic layer extending by 2 to 5 $\mu$m on the side facing to the magnetic recording medium is 0.1 $\mu$m to 1 $\mu$m thick, while the remaining part of said lower magnetic layer is 1 $\mu$m to 6 $\mu$m thick, and said upper magnetic layer is 5 $\mu$m to 40 $\mu$m.

7. A perpendicular magnetic recording and reproducing thin film head as defined in claim 1, wherein at least a part of said lower magnetic layer is either of a magnetic alloy which contains Fe and Si as its principal ingredients and an alloy which contains Fe and Ti as its principal ingredients.

8. A perpendicular magnetic recording and reproducing thin film head as defined in claim 1, wherein at least a part of said upper magnetic layer is an amorphous magnetic alloy.

9. A perpendicular magnetic recording and reproducing thin film head as defined in claim 1, wherein said second insulator layer is made of an inorganic insulator.

10. A perpendicular magnetic recording and reproducing thin film head as defined in claim 1, wherein said second insulator layer is made of an organic insulator.

11. A perpendicular magnetic recording and reproducing thin film head as defined in claim 10, wherein said organic insulator is a polyimide type resin.

* * * * *